Nov. 19, 1929.  I. M. CLAUSEN ET AL  1,735,892
RULE FOR MEASURING WEIR DISCHARGE
Filed July 16, 1926
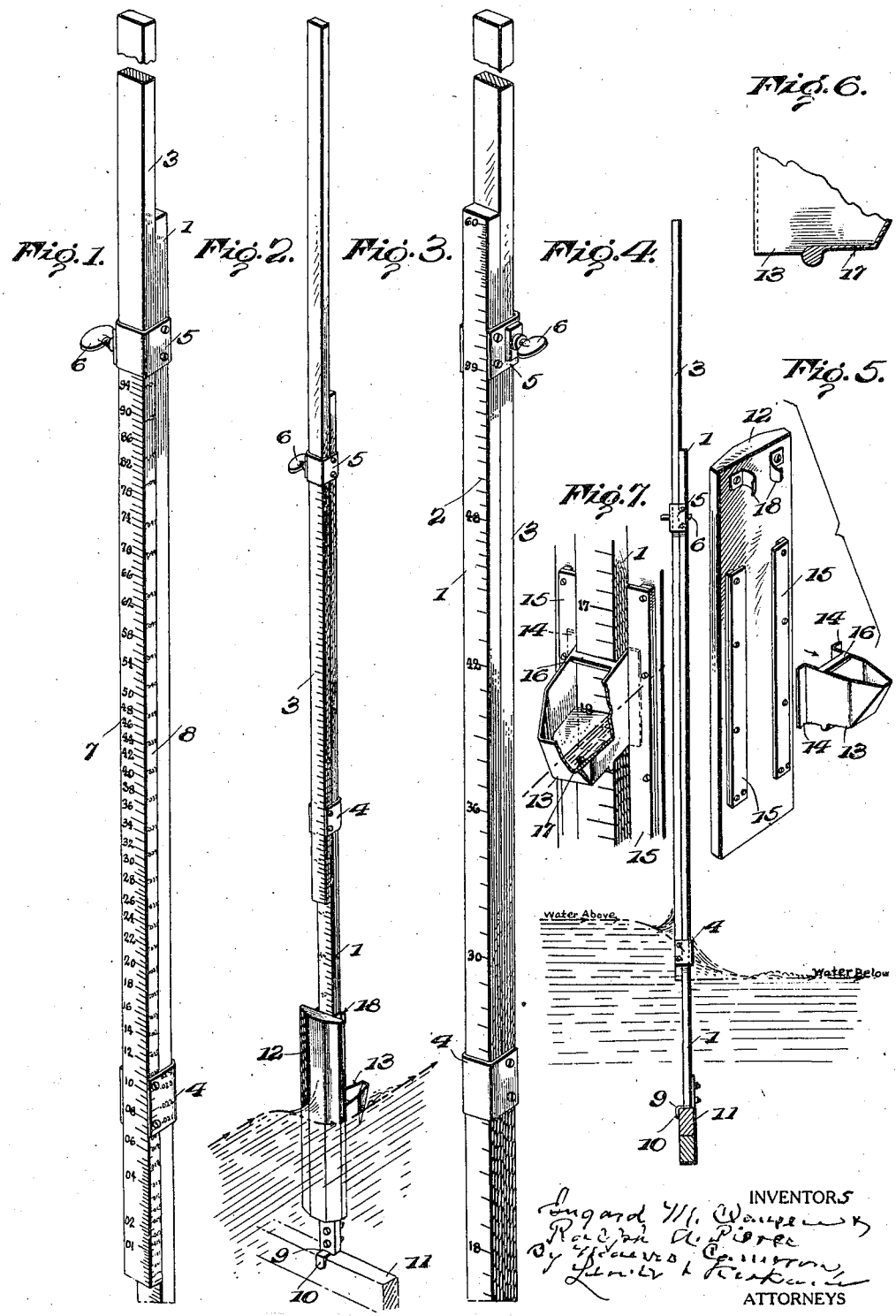
INVENTORS
ATTORNEYS Patented Nov. 19, 1929

1,735,892

UNITED STATES PATENT OFFICE

INGARD M. CLAUSEN AND RALPH A. PIERCE, OF PHOENIX, ARIZONA

RULE FOR MEASURING WEIR DISCHARGE

Application filed July 16, 1926. Serial No. 122,994.

This invention relates to the art of obtaining accurately measured quantities of water flowing over a weir, whether of the submerged or free-flowing type, and is an improvement on our application Serial No. 658,105, filed Aug. 18, 1923.

Heretofore authorities have regarded submerged weirs as impractical for use in locations where it was desired to obtain accurately measured quantities of water flowing over the weir, and such authorities have varied widely in regard to the best methods to pursue in obtaining measurements that would even be approximately correct. In irrigation projects, where water is taken from a main or supply channel and diverted into lateral channels for the purpose of irrigating land, the demand is for the supply of an accurately measured quantity of water as required by the land owner. In free-flowing weirs, the method followed in practical operations has been to ascertain by repeated measurements for each weir used, the value of the two necessary factors in determining the amount of water passing over the weir, to wit, the velocity of the approach of the water in the channel above the weir and the "head" above the crest of the weir. Ordinarily, an engineer takes measurements some distance upstream from the weir to ascertain the velocity of the approach of the water, and this, once established, is used for some considerable period of time. But the velocity of approach in a channel varies materially at different periods because of changing conditions in the channel due to the growth of vegetation along the banks thereof, the deposit of silt, and other causes, so that the velocity of approach is constantly changing. Furthermore, in a free-flowing weir, in order to determine the "head" above the crest of the weir, it is the practice to measure the level of the water some considerable distance upstream from the weir. With the data secured by the measurements indicated, giving the velocity of approach and the head of the water above the weir, a trained engineer can calculate with a fair degree of accuracy the amount of water delivered over a free-flowing weir in a given time, such calculations requiring, however, the knowledge of a trained engineer and cannot be made by ordinary laborers of grade school education. Furthermore, when a specified measured quantity of water is desired to be delivered into a lateral, repeated measurements have to be made and the height of the water in the main channel varied until the desired quantity is found to be delivered to the lateral.

In the case of a submerged weir, the factors entering into a determination of the amount of water delivered over the weir are (1) the head of the water upstream from the weir, (2) the head of the water downstream from the weir, and (3) the velocity of approach. The velocity of approach is determined in the same manner as in connection with the free-flowing weir and is subject, therefore, to the same variations and inaccuracies before indicated, unless a measurement and calculation of the velocity of approach for each delivery of water into the lateral are made. The head of the water upstream from the weir is measured some considerable distance from the weir, and likewise the head of the water downstream from the weir is taken at a considerable distance from the weir. The proper distance downstream at which to take the head is a matter of controversy between various authorities and with widely differing results. Furthermore, as in the case of a free-flowing weir, the height of the submerged weir or of the water flowing over the weir has to be varied until experimental measurements determine that the amount of water delivered is the measured quantity desired, and this latter determination, it is universally agreed by the best authorities, is so inaccurate that submerged weirs have heretofore been regarded by such authorities as impractical in actual commercial operations.

One of the objects of the present invention is to provide means whereby a single measurement taken immediately at the weir will afford data whereby an accurate calculation of the amount of water flowing over a weir of any given dimensions may be made, thus eliminating the necessity of taking measurements to determine the velocity of approach or the head of the water either up or downstream from the weir.

Another object is to provide means whereby such measurements may be taken and accurate calculations made to determine the amount of water passing over a weir, whether of the free-flowing or submerged type, by an ordinarily well-informed school boy and without the necessity for technical training along engineering lines or a knowledge of higher mathematics.

A further object is to provide means whereby the amount of water flowing over a submerged weir may be determined as readily and as accurately as such determinations have heretofore been made in connection with free-flowing weirs.

A still further object of the invention is to provide a simple, portable, measuring device, readily handled by the attendant in making the measurements and in moving from weir to weir.

Other objects of the invention will appear as the description of the invention proceeds.

With these objects in view, the invention consists, generally stated, of a compound measuring rule for measuring water passing over a weir, said rule embracing two elements in the form of narrow bars of wood or other suitable material of uniform width and adjustably secured together, so as to slide, the one longitudinally with relation to the other. These bars may be of any suitable width and, for the purpose of describing the invention and in practice, we employ bars an inch and three-eighths in width and approximately three-fourths of an inch thick. These two bars are clamped together by a suitable clamping device which enables them to be adjusted to any desired longitudinal position with relation to each other and then secured in that position. One of these bars has any ordinary linear scale, such for example as an inch scale, though manifestly it might be any other scale, such as the metric scale. Such scale is preferably placed on both sides of the bar, the zero of the scale being at the foot or lower end of the bar and the scale reading upward.

The second bar is provided with a logarithmic scale reading from zero upward to any desired extent, the zero end of the scale being at the lower end of said second bar. The construction of this logarithmic scale is based on certain discoveries which we have made. We have discovered that, if this stick or measuring rule be placed on the crest of the weir, the maximum runup or "surge" of the water on the upstream side of the bar will go somewhat above the head of the water in the channel above the weir. We have further discovered that the distance from the crest of the weir to the top of the maximum surge may be substituted for the head and velocity of approach in formulæ for calculating the amount of water discharged over the weir. If a measuring rule be placed in the channel immediately over a submerged weir, and resting on the crest of the weir, water will surge or run up against said measuring rule to an appreciable height. On the downstream side of the rule and close to the same, there is formed a comparatively stilled level surface of water readily distinguishable from the flow of the water around the rule on either side thereof, and we employ the distance between the maximum or uppermost point of the surge and the level of this still surface in determining the amount of water flowing over a submerged weir. This is done in the following manner. We have discovered by repeated experiment that the level of the above-mentioned still surface may be treated as the level of the water downstream below the weir from which the downstream "head" may be calculated, and that all of that portion of the water flowing over the weir below said level may therefore be treated as flowing through a rectangular orifice whose dimensions are the width of the weir and the distance between said still surface and the crest of the weir; and that all of that portion of the water flowing over the weir above said still surface may be treated as water passing over a free-flowing weir. We have also discovered that the distance between the maximum surge and the level of said still surface in making the calculations as to the water that would flow through the orifice may be employed in the formulæ in making the calculation as a substitute for the head and velocity of approach; and furthermore that in calculating that portion of the water which is to be treated as passing over a free-flowing weir, said distance may be substituted in the formula for the head and velocity of approach.

The inventive idea may be variously employed and various forms of measuring devices may be employed in carrying out the inventive idea, without departing from the spirit of the invention. In the accompanying drawings, one form which the apparatus of the invention may assume is illustrated for the purpose of description, but it is to be expressly understood that such drawings are not designed to define the limits of the invention, reference being had to the appended claims for this purpose. In said drawings—

Fig. 1 is a perspective of our improved measuring rule;

Fig. 2 is a like view illustrating the manner of using the same over a weir;

Fig. 3 is a broken perspective showing the back or downstream side of the rule or stick with a linear scale thereon;

Fig. 4 is a side view of the rule in position on a weir;

Figs. 5 and 6 are details of a special construction we employ to determine the level of the still surface on the downstream side of the rule; and Fig. 7 is a perspective detail of the stilling well with parts broken away.

In said drawings, like numerals indicate like parts throughout the several views. We prefer to employ a bar 1, preferably, though not necessarily, about one and three-eighths inches in width and about three-fourths of an inch thick, and on each of the opposite faces of said bar (only one of which is shown in the drawings) we place a linear scale 2, which scale is here shown as an inch scale, though a metric or any other desired linear scale could be employed. A second bar 3, of like dimensions with said bar 1, is secured to the bar 1 by means of suitable guides 4 and 5, the guide 4 being preferably secured to the bar 3 and the guide 5 to the bar 1, so as to embrace and hold said bars closely face to face, but to permit them to slide longitudinally with relation to each other. In one of these guides, here shown as the guide 5, a clamping screw 6 is mounted, by means of which the parts may be readily secured in any desired adjustment.

On the outer face of the bar 3 is a logarithmic scale 7 with the zero of the scale at the bottom or foot of the bar. This logarithmic scale 7 is a matter of importance and its construction will depend upon or be based upon the unit of measurement employed, whether second feet, miners' inches, or gallons per minute. In the present instance we have chosen to illustrate the invention by employing the second foot as the unit. Let it be assumed that the formula for calculating the flow of water over a weir known as the Francis formula is to be employed. This formula is as follows:

$$Q = 2/3 \, CL\sqrt{2G} H^{3/2}$$

in which Q is the quantity of water discharged over the weir; C is the empirical coefficient; L the length of the weir; G the acceleration due to gravity; H the head; from which it follows that—

$$H = \left(\frac{3Q}{2CL\sqrt{2G}}\right)^{2/3}$$

We have determined by a series of experiments that in such a formula, the value of the empirical coefficient C (when the formula is calibrated on a rule which is adapted to be placed in the channel above the weir, thereby obstructing somewhat the flow of water) is a variable which varies as the width of the rule is to the width of the weir. While a rule of any suitable width may be employed, we prefer to adopt a width of one and three-eighths inches, for which width the value of C we have determined by experiment to be .607.

Now, assuming this value of C, and assuming L to be 1, successively increasing values of Q may be substituted in the above formula and a series of corresponding values of H obtained. If these values of H are marked successively on the face of the bar 3, beginning at the bottom of the bar and extending upward, and the corresponding value of Q be placed opposite each mark, there will be provided a logarithmic scale indicating the second feet of water passing over the weir, per unit of weir length, for each value of H. This is the logarithmic scale 7. When the bar, with the scale thus constructed, is placed in the channel on the crest of the free-flowing weir, the surge or runup can be read on this logarithmic scale, and we have discovered, and verified by repeated experiment, that the reading on the scale 7 at the point of maximum surge or runup gives the actual amount of water discharged over the weir per unit of width thereof, and by multiplying this amount by the width of the weir expressed in the same units, the actual amount of water flowing over the weir may be determined without the necessity of any correction for velocity of approach.

Associated with the logarithmic scale 7 is a second logarithmic scale 8 which, for convenience, is here shown as placed on the edge of bar 3, that is, the same bar upon which the logarithmic scale 7 is placed, the divisions of each of the scales extending to the angle of the bar between the two scales so that the two can be read in conjunction one with the other for a purpose which will hereinafter appear. This logarithmic scale 8 has its zero point at the foot or bottom of the bar 3 and therefore coincides with the zero point of the scale 7. While we prefer to place scale 8 as shown, it will be readily appreciated that any other arrangement whereby the two scales can be placed side by side with a common zero point would serve the same purpose.

Since the value of the maximum surge in either a submerged or free-flowing weir may be substituted for the value of the head and velocity of approach, it follows that all that part of the water falling over the crest of the weir between the crest and the level of the still surface on the downstream side of the bar may be regarded as water flowing through a submerged rectangular orifice under a head equal to the distance between the level of the still surface and the top of the maximum surge; and it further follows that that portion of the water above the level of the still surface may be regarded as water passing over a free-flowing weir under the same head. By ascertaining these two amounts and adding the same together, the total amount of water passing over a submerged weir may therefore be accurately determined. It is for the purpose of determining the amount of water that would pass through the rectangular orifice that the scale 8 is employed. The construction of this scale is based upon the fact which we have discovered and verified by a large number of tests and experiments, that in the standard formula for calculating the amount of water passing through a rectangular submerged orifice, the empirical coefficient C has a value of .589, which, however, is subject to slight correction, dependent upon the relation of the width of the measuring rule to the width of the weir. We have further determined that, with weirs of the widths ordinarily employed and a measuring rule of a width of one and three-eighths inches, this empirical coefficient should be corrected to .58. Theoretically, a correction would have to be made for different weirs of different widths, but in actual practice this correction would be so small that, for variations which exist in weirs as ordinarily employed, this is negligible, and we have found that .58 as the empirical coefficient will give results within 2% and even as low as one-fourth of 1% of the actual water flowing over the submerged weir.

The standard formula for calculating the second feet of water flowing through a submerged rectangular orifice is $$Q = CA\sqrt{2GH}$$

wherein A is the area of the theoretical orifice, from which it follows that—

$$H = \left(\frac{Q}{CA\sqrt{2G}}\right)^2$$

Assuming C has a value of .58, and that A is equal to 1, successive values of Q may be substituted in the above formula and a series of corresponding values of H obtained, which may be laid off successively on the bar 3 as described above in connection with the scale 7, and which will constitute the logarithmic scale 8.

By placing the rule in its proper position on the crest of the weir as described hereinafter, and reading the maximum surge on the scale 7, and then by determining the reading of scale 8 which corresponds to said reading on scale 7, a value is obtained which indicates, in the terms of the unit of measurement chosen, the amount of water discharged per square inch of orifice opening. Now, if the orifice descharge per square inch is multiplied by the depth of the orifice in inches, the orifice discharge per linear unit of the weir is obtained. The amount of water discharged over the free-flowing weir, per unit of width, having been determined as explained above my means of the surge reading, these two factors added together give the total discharge over the submerged weir per unit of width, which, when multiplied by the width of the weir, gives the total amount of water flowing thereover.

Any suitable means may be employed to cause the zero line of each of the scales 7 and 8 to exactly coincide with the bottom or foot of the linear scale bar 1. As here shown, a strip of metal 9 is bolted or otherwise secured to the side of the scale bar 1 and bent at right angles across the foot thereof and mortised therein so that the lower surface of the bent strip of metal exactly coincides with the lower end of the bar 1. This strip of metal extends across the bar 1 and across the whole or a portion of the bar 3, in which latter bar it is also inset so that the lower ends of the two bars 1 and 3 and the lower face of the metal strip 9 are all in the same plane. The end of the bent strip is then bent vertically downward, as at 10, to provide a shoulder for adjusting the same against the face of the weir crest 11, so that it serves as a means to resist the force of the current.

As a convenient means of taking the still water level referred to above, we preferably attach a stilling well to the downstream side of our rule. This well may be of any suitable construction and attached to the rule in any suitable manner. Preferably, however, we provide a removable stilling well illustrated in Figs. 5 and 6, and shown as applied to the linear rule bar 1 in Fig. 2. A plate or board 12, preferably beveled on the upstream face thereof, is applied to the upstream face of the bar 1. This board may vary in width to suit the varying conditions due to the varying quantities of water that would flow over the different weirs, but for all ordinary purposes in irrigating systems it may be aproximately four inches in width. On the downstream side of the bar 1 we apply a bucket 13, preferably made of sheet metal and having outwardly flaring ears 14 as shown in Fig. 5. The bucket is placed on the downstream side of bar 1, which it straddles and fits closely, and the ears 14, 14 take under two rails 15, 15 which are slightly spaced from the surface of the board 12. Said bucket 13 has a transversely extending bar 16 connecting the sides thereof and so positioned as to snugly fit the downstream face of the bar 1. This bucket is provided with a bottom opening 17 (Fig. 6), and preferably spring clamps 18 are provided on the board 12 above the bucket to snugly grasp the edges of the bar 1.

When the parts are assembled as shown in Fig. 2, the bucket 13 is entirely closed except at the top and the opening 17 in the bottom thereof, and when the current of water flows past the rule, as indicated in Fig. 2, the water will rise within the well and afford a still surface, the level of which may be easily read on the downstream face of the bar 1, and, as before described, the level of the water in this stilling well we have found by repeated experiments to be on the line constituting the upper edge of that portion of the water flowing over a submerged weir that may be treated as flowing through an orifice opening.

The practical use of our improved weir measuring rule would be as follows:—

*Free-flowing weir.*—For use on a free-flowing weir, the two members 1 and 3 would be adjusted with their lower ends at the zero elevation, that is, with their lower ends exactly coinciding, and the foot of the rule would be placed upon the crest of the weir with the logarithmic scale 7 on the face of the rule turned upstream, and the maximum height of the uprun or surge on said scale noted. Let it be assumed that such maximum surge is at .20 and that the width of the weir is 30 inches. Since the maximum upsurge indicates the number of second feet per inch of the weir, it is only necessary to multiply .20 by 30 to obtain the total discharge over the weir per second.

*Submerged weir.*—For use in connection with a submerged weir, the parts are assembled with the stilling well on the rule as shown in Fig. 2, the stilling well being adjusted upward on the bar 1 to the approximate still water height when the foot of the rule is resting on the crest of the weir. The level of the still water in the stilling well is then read on member 1 through the open top of the well, and the still well is then removed from the rule and the foot of the bar 3 is adjusted to that level. When so adjusted and with the foot of the linear scale 1 resting on the crest of the submerged weir, all that portion of the water, as above described, below the foot of the bar 3 may be treated as water flowing through a rectangular orifice whose dimensions are the width of the weir and the height of the bar 3 above the crest of the weir; and by observing the maximum uprun on the logarithmic scale 7 on the face of the bar 3, and checking the corresponding value of the logarithmic scale 8 on the edge of the bar, and multiplying this latter value by the area of the orifice, the discharge through the orifice portion of the weir is obtained. As before mentioned, the foot of the bar 3 when adjusted as last described may be regarded as resting upon the crest of a free-flowing weir and the amount of the water passing over the weir above said foot can be calculated by observing the maximum uprun or surge on the scale 7 on the face of the bar 3, and multiplying this value by the width of the weir. These two amounts thus secured, when added together, will give, with great accuracy, the total amount of water passing over the weir per second.

It will be readily appreciated by those skilled in the art that the invention may be embodied in various forms and that various modifications may be made in the details of construction as hereinbefore described without departing from the spirit of our invention, and it is to be expressly understood that such variations and modifications as come within the spirit of our invention are intended to be included in the terms of the accompanying claims.

It will further be appreciated that the novel method hereinbefore described and constituting a part of applicants' invention may be carried out with a variety of apparatus, one form of which is shown in this application and another form of which is shown in applicants' copening application Serial No. 247,700, filed January 18, 1928, and applicants elect to claim their method in the aforesaid copending application Serial No. 247,700.

What is claimed is:—

1. An instrument for measuring quantities of water flowing over a weir, adapted to be positioned vertically on the weir crest and calibrated to show, when thus positioned vertically with its zero point at the still water level at its down-stream face, the rate of water flow above said still water level corresponding to the height to which the water rises on its upstream face.

2. An instrument for measuring quantities of water flowing over a weir, adapted to be positioned vertically on a weir crest and calibrated to show, when thus positioned vertically with its zero point at the still water level at its down-stream face, the rate of water flow below said still water level corresponding to the height to which the water rises on its upstream face.

3. An instrument for measuring quantities of water flowing over a weir and adapted to be positioned vertically on a weir crest, said instrument including means for determining the still water level at its downstream face and being calibrated to show the rate of water flow above and below said level corresponding to the height to which the water rises on its upstream face when it is vertically positioned on the weir crest with its zero point at said still water level.

4. An instrument for measuring quantities of water flowing over a weir, adapted to be positioned vertically on a weir crest and calibrated to show, when thus positioned vertically with its zero point at the still water level at its down-stream face, the rates of water flow respectively above and below said still water level corresponding to the height to which the water rises on its upstream face.

5. An instrument for measuring quantities of water flowing over a weir, adapted to be positioned vertically on a weir crest and calibrated to show, when thus positioned vertically with its zero point at the still water level at its down-stream face, the rate of water flow per unit of weir length above, and the rate per unit of area below, said still water level corresponding to the height to which the water rises on its upstream face.

6. In apparatus for obtaining measured quantities of water flowing over a weir, a member adapted to be disposed vertically above the weir crest to act as an obstruction to the flowing water whereby a surge is created on the upstream face thereof, said member bearing a scale calibrated to show the rate of water flow corresponding to the height of said surge.

7. In apparatus for obtaining measured quantities of water flowing over a weir, a member adapted to be disposed vertically above the weir crest to act as an obstruction to the flowing water whereby a surge is created on the upstream face thereof, said member bearing a scale adapted to show the rate of water flow, per unit of weir length, corresponding to the height of said surge.

8. In apparatus for obtaining measured quantities of water flowing over a weir, a member adapted to be disposed vertically above the weir crest to act as an obstruction to the water flow whereby a surge is created on its upstream face, said member including an adjustable scale element whose zero point may be positioned at the still water level on the downstream side of said obstruction and said adjustable scale element bearing scales calibrated to show the rates of water flow respectively above and below said still water level corresponding to the height of said surge when said element is adjusted so that its zero point is at the down-stream still water level.

9. In apparatus for obtaining measured quantities of water flowing over a weir, a member adapted to be disposed vertically above the weir crest to act as an obstruction to the water flow whereby a surge is created on its upstream face, said member including an adjustable scale element whose zero point may be positioned at the still water level on the downstream side of said obstruction and said adjustable scale element bearing scales calibrated respectively to show the rate of water flow, per unit of weir length above the still water level and the rate per unit of area below the still water level, corresponding to the height of said surge when said element is adjusted so that its zero point is at the down-stream still water level.

10. In apparatus for obtaining measured quantities of water flowing over a weir, a member adapted to be disposed vertically above the weir crest to act as an obstruction to the water flow whereby a surge is created on the upstream face of said obstruction, said member including an adjustable scale element adapted to be positioned with its zero point at the still water level on the downstream face of said element, said member bearing a scale to determine the height of said still water level above the crest of the weir and said adjustable scale element being calibrated to show the rate of water flow, per unit of area below its zero point, corresponding to the height of said surge when said element is adjusted so that its zero point is at the down-stream still water level.

11. In apparatus for obtaining measured quantities of water flowing over a weir, a member adapted to be disposed vertically above the weir crest to act as an obstruction to the water flow whereby a surge is created on the upstream face of said obstruction, said member including an adjustable scale element adapted to be positioned with its zero point at the still water level on the downstream face of said element, said member bearing a scale to determine the height of said still water level above the crest of the weir and said adjustable scale element being calibrated to show the rate of water flow, per unit of weir length above its zero point, corresponding to the height of said surge when said element is adjusted so that its zero point is at the down-stream still water level.

12. In apparatus for obtaining measured quantities of water flowing over a weir, a member adapted to be disposed vertically above the weir crest to act as an obstruction to the water flow whereby a surge is created on the upstream face of said member, and means for determining the still water level on the downstream face of said member, said member including an adjustable scale element adapted to be positioned with its zero point at the determined still water level and calibrated to show the rates of water flow, respectively above and below said still water level, corresponding to the height of said surge when said element is adjusted so that its zero point is at the down-stream still water level.

13. In apparatus for obtaining measured quantities of water flowing over either a submerged or a free-flowing weir, a member adapted to be disposed vertically above the weir crest to act as an obstruction to the flowing water whereby a surge is created on its upstream face, said member including an adjustable scale element adapted to be so positioned that its zero point is either at the weir crest or at the still water level on the downstream face of said member and calibrated to show the rates of water flow, respectively above and below its zero point, corresponding to the height of said surge when said element is adjusted so that its zero point is at the down-stream still water level.

14. In apparatus for obtaining measured quantities of water flowing over either a submerged or a free-flowing weir, a member adapted to be disposed vertically above the weir crest to act as an obstruction to the flowing water whereby a surge is created on its upstream face, said member including an adjustable scale element adapted to be so positioned that its zero point is either at the weir crest or at the still water level on the downstream face of said member and calibrated to show the rates of water flow, respectively above and below its zero point, corresponding to the height of said surge when said element is adjusted so that its zero point is at the down-stream still water level, said member bearing a further scale for measuring the height above the weir crest of the zero point of said first-named scale.

15. In apparatus for obtaining measured quantities of water flowing over either a submerged weir or a free flowing weir, a member adapted to be disposed vertically above the weir crest to act as an obstruction to the flowing water whereby a surge is created on its upstream face, said member including an adjustable scale element adapted to be positioned with its zero point either at the crest of the weir or at the still water level on the downstream face of said member and calibrated to show the rates of water flow, per unit of weir length above its zero point and per unit of area below its zero point, corresponding to the height of said surge when said element is adjusted so that its zero point is at the down-stream still water level.

16. In apparatus for obtaining measured quantities of water flowing over either a submerged weir or a free flowing weir, a member adapted to be disposed vertically above the weir crest to act as an obstruction to the flowing water whereby a surge is created on its upstream face, said member including an adjustable scale element adapted to be positioned with its zero point either at the crest of the weir or at the still water level on the downstream face of said member and calibrated to show the rates of water flow, per unit of weir length above its zero point and per unit of area below its zero point, corresponding to the height of said surge, when said element is adjusted so that its zero point is at the down-stream still water level and said member bearing a further scale for measuring the height of the zero point of said adjustable scale above the weir crest.

17. In an apparatus of the character described, the combination of two elongated scale members longitudinally adjustable with relation to each other, one of said members having a linear scale thereon and the other having a scale calibrated to show the rates of water flow above its zero point corresponding to different surge heights when the members are disposed vertically above the weir crest.

18. In an apparatus of the character described, the combination of two elongated scale members longitudinally adjustable with relation to each other, one of said members having a linear scale thereon and the other having two scales thereon with a common zero point, one of said two scales being calibrated to show the rates of water flow above its zero point corresponding to different surge heights and the other being calibrated to show the rates of water flow below its zero point corresponding to said surge heights when said members are disposed vertically above a weir crest with the zero point of the two-scaled member at the down-stream still water level.

19. In an apparatus of the character described, the combination of a vertical bar having a linear scale thereon, with a stilling well vertically adjustable on one side of said bar.

20. In apparatus for obtaining measured quantities of water flowing over a weir, a member adapted to be disposed vertically above the weir crest to act as an obstruction to the water flow whereby a surge is created on the upstream face of said obstruction, said member including an adjustable scale element adapted to be positioned with its zero point at the still water level on the downstream face of said element, said member bearing a scale to determine the height of said still water level above the crest of the weir and said adjustable scale element bearing scales respectively calibrated to show the rate of water flow, per unit of area below its zero point and per unit of weir length above its zero point, corresponding to the height of said surge.

21. An elongated instrument for measuring quantities of water flowing over a weir and adapted to be positioned vertically on the weir crest so as to produce a surge on its upstream face, said instrument including means for determining the still water level on its downstream face and a scale element adapted to be positioned with its zero point at either the weir crest or the determined still water level and calibrated to show the rate of water flow per unit of weir length above, and the rates per unit of area below, its zero point corresponding to the height of the surge rising on its upstream face when it is positioned vertically above the weir crest with its zero point at the down-stream still water level, said instrument also having a scale to measure the height of said zero point above the weir crest.

22. An elongated instrument for measuring quantities of water flowing over a weir and adapted to be positioned vertically on the weir crest so as to produce a surge on its upstream face, said instrument including means for determining the still water level on its downstream face and a scale element adapted to be positioned with its zero point at the determined still water level and calibrated to show the rate of water flow per unit of weir length above, and the rates per unit of area below, its zero point corresponding to the height of the surge rising on its upstream face when it is positioned vertically above the weir crest with its zero point at the down-stream still water level.

23. As a new article of manufacture, a weir discharge rule comprising an elongated member provided with a broad face, said face having thereon a scale of graduations and indicia applied thereto and adapted to indicate at the point of registration of the maximum surge of the liquid on the member, when the rule is placed in a vertical position in the weir with its lower end on the weir crest, the amount of water discharged per unit of width of the notch.

24. The combination with means providing a weir notch, of an elongated member vertically positioned in the notch with one end resting on the crest of the notch, said member being provided with a broad face, said face having thereon a scale of graduations and indicia applied to the graduations and adapted to indicate at the point of registration of the maximum surge of the liquid on the member when the member is thus positioned the amount of water discharged per unit of width of the notch.

In testimony whereof we have signed this specification.

INGARD M. CLAUSEN.
RALPH A. PIERCE.